July 30, 1946.  G. L. PRUDHON  2,404,886
ELECTRICAL MEASURING SYSTEM
Filed March 14, 1944

INVENTOR
G.L. PRUDHON
BY
C.B. Hamilton
ATTORNEY

Patented July 30, 1946

2,404,886

UNITED STATES PATENT OFFICE 2,404,886

ELECTRICAL MEASURING SYSTEM

Glenn L. Prudhon, North Plainfield, N. J., assignor to Western Electric Company, Incorporated, New York, N. Y., a corporation of New York Application March 14, 1944, Serial No. 526,420

5 Claims. (Cl. 171—95)

This invention relates to electrical measuring systems embodying electrical meters, and more particularly to such measuring systems for eliminating calculations for meter drain corrections.

An object of the invention is to provide a compensating circuit having maximum efficiency in rendering the readings of electrical meters accurate without requiring human effort in calculating and applying meter drain corrections in making electrical measurements.

In accordance with one embodiment of the invention, which is particularly adapted in testing non-linear devices such as varistors or cuprous oxide rectifiers where the current through the varistors must be read accurately at a given voltage across its terminals, there is provided an independent winding in an ammeter which conducts in a feed back the current drawn by the voltmeter to nullify any erroneous effect on the ammeter reading.

Figure 1:
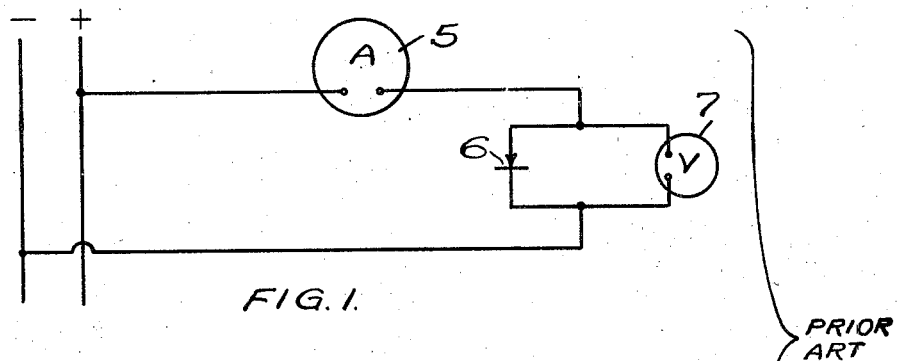
Figure 2:
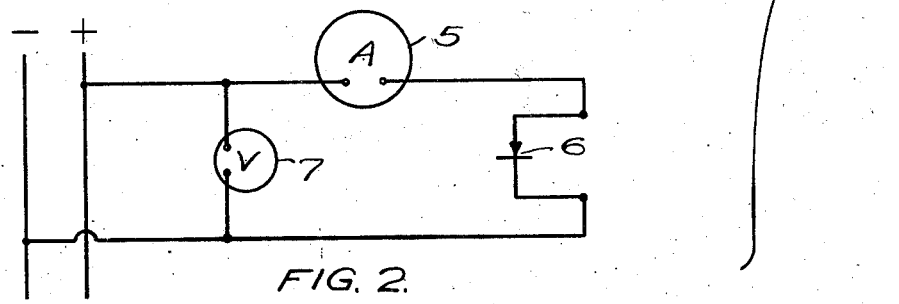
Figure 3:
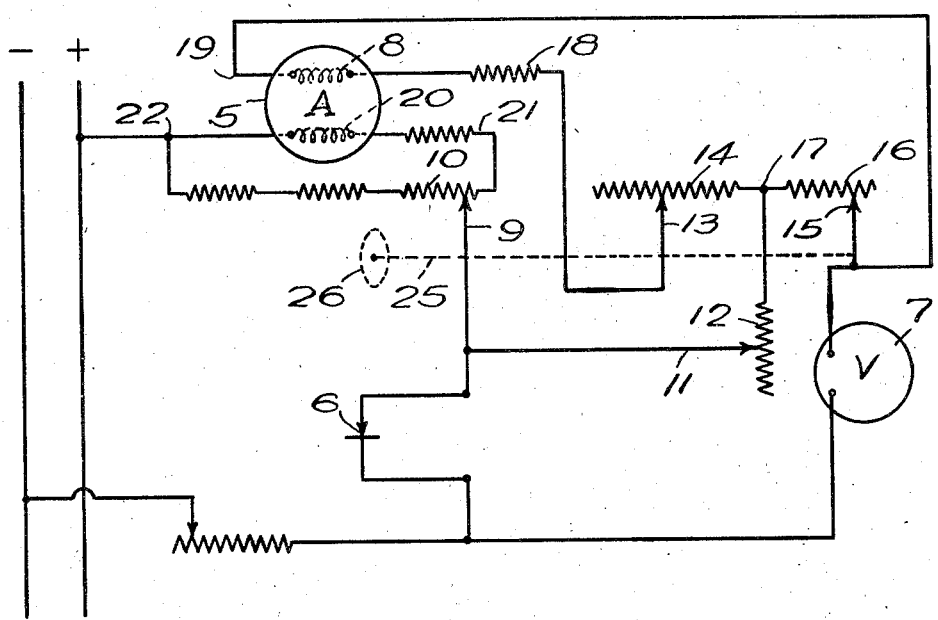

A better understanding of the invention and its objects may be had by reference to the following detailed description when considered in conjunction with the accompanying drawing, wherein Fig. 1 is a schematic diagram of the usual prior art circuit where the voltmeter is connected directly across the varistor under test and the current drain of the voltmeter must be subtracted from the ammeter reading;

Fig. 2 is a schematic diagram of another prior art circuit where the voltmeter is connected in the circuit ahead of the ammeter so that the voltage drop across the ammeter must be considered in order to obtain the correct voltage across the varistor under test, and Fig. 3 is a diagrammatic view of an automatic meter drain correction circuit embodying the invention.

Referring now to the drawing wherein like reference characters designate the same parts throughout the several views, the numeral 5 designates an ammeter which is used to measure the electrical current passing through a varistor 6 under test. In determining if these varistors are satisfactory it is necessary to accurately measure the current passing through the varistor under test at a given voltage across its terminals.

As shown in Fig. 1 if a voltmeter 7 is connected directly across the varistor 6 under test in accordance with usual practice, the current drain of the voltmeter must be subtracted from the reading indicated by the ammeter 5 to obtain desired accuracy.

If the voltmeter 7 is connected in the test circuit ahead of the ammeter 5 as shown in Fig. 2 then the voltage drop across the ammeter must be taken into consideration and calculations made to obtain the true or actual voltage across the terminals of the varistor 6.

The use of the prior art test circuits shown in Figs. 1 and 2 requires considerable mental effort on the part of the operator in making meter drain corrections and where the operator errs in making such drain calculations, the varistors or other articles being tested which are defective are wrongly passed as being satisfactory.

To avoid this loss of time in making meter drain corrections and to avoid confusion resulting from human errors in making calculations, the invention in Fig. 3 is provided wherein the current drawn by the voltmeter 7 is fed back through an independent winding 8 in the ammeter 5 to automatically compensate for the current drain of the voltmeter to give a true and accurate reading.

As shown in Fig. 3 an adjustable arm 9 is used to vary the resistance 10 to select the current range and another adjustable arm 11 is used to vary the resistance 12 to select the voltage range in the test circuit. Arm 9, adjustable arm 13 of resistance 14 and adjustable arm 15 of resistance 16 may be secured to a single shaft 25 (indicated in dotted lines) and may be moved simultaneously by moving a knob 26 fastened to the end of such shaft.

The voltmeter 7 of Fig. 3 is constructed so that its range may be increased by adding external resistances, called multipliers. The lowest multiplier of the voltmeter 7 consists of the circuit 17, 14, 13, 18, 19 in parallel with the circuit 17, 16, 15 and hence all current drawn by the voltmeter 7 on any range must pass through these two circuits. The resultant resistance of the two circuits must always equal a constant value if the voltmeter is to give an accurate indication. The resistances in these two circuits must also be so adjusted that the currents therethrough shall be proportional to the two currents, one through the ammeter winding 20 and the other through the ammeter shunt 10. If the independent winding 8 is equal to the winding 20 of the current meter 5 (Fig. 3) then for all settings of ammeter range the currents through the various circuits shall be in the following proportions:

$$\frac{9, 21, 20, 22}{9, 10, 22} = \frac{17, 14, 13, 18, 8, 19}{17, 16, 15}$$

Also the various resistances of the voltmeter circuits may be expressed by the following equation:

$$\frac{1}{17, 14, 13} + \frac{1}{17, 14, 18, 8, 19} = \frac{1}{K}$$

where K equals the resistance of the lowest voltmeter multiplier. Thus the voltmeter drain is compensated for in the ammeter for any setting of either the voltmeter or ammeter range selectors. This ammeter may be of the type manufactured by the Weston Electrical Instruments Corporation and described in their catalogue No. 11 on page 33 as model 264.

It will be clear therefore that the electrical measuring system shown in Fig. 3 constitutes a very efficient apparatus for eliminating the prior necessity of making meter drain corrections. This measuring system is not limited to the use described herein as one embodiment of the invention but has universal application in that it can be used in various production measurements in manufacturing and for general laboratory purposes.

What is claimed is:

1. In an electrical measuring system for eliminating meter drain corrections, means for measuring the potential difference across an article under test, means for measuring the current passing through the article, and a compensating means in magnetic communication with the current measuring means and controlled by the current drawn by the potential measuring means.

2. In an electrical measuring system, a voltmeter for measuring the voltage across an article under test, a current meter having a coil for measuring the current passing through the article, and a compensating coil in magnetic cooperation with the coil in the current meter and connected to the voltmeter so as to be controlled by and to compensate for the current drawn by the voltmeter.

3. In an electrical measuring system, an ammeter for measuring the current passing through an article under test, a voltmeter for measuring the voltage across the article, and a compensating coil in magnetic cooperation with the field of the ammeter and connected in series with the voltmeter and controlled by the current drawn by the voltmeter to automatically compensate for such voltmeter current drain to provide an accurate measurement of the current passing through the article.

4. In an electrical measuring system, a voltmeter for measuring the voltage across an article under test, an ammeter for measuring the current passing through the article, adjustable means for selecting the current range, adjustable means for selecting the voltage range, means for simultaneously adjusting the plurality of selecting means, and a compensating means in magnetic communication with the ammeter and controlled by and to compensate for the current drawn by the voltmeter as determined by the setting of the selecting means.

5. In an electrical measuring system, an ammeter for measuring the current passing through an article under test, a resistance divider circuit for the ammeter, a voltmeter for measuring the voltage across the article, a compensating coil in the ammeter and connected in series with the voltmeter, and means for varying the resistances of the ammeter divider circuit, of the compensating coil and of the voltmeter for predetermined ranges of voltage and current so that voltmeter current drain is compensated for in the ammeter by the compensating coil.

GLENN L. PRUDHON.